(12) United States Patent
Nishio et al.

(10) Patent No.: US 12,374,309 B2
(45) Date of Patent: Jul. 29, 2025

(54) INFORMATION PROCESSING APPARATUS WITH BRIGHTNESS REDUCTION PROCESSING AND CONTROL METHOD FOR BRIGHTNESS REDUCTION PROCESSING

(71) Applicant: Lenovo (Singapore) Pte. Ltd., Singapore (SG)

(72) Inventors: Masashi Nishio, Kanagawa (JP); Yuji Wada, Kanagawa (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 18/643,066

(22) Filed: Apr. 23, 2024

(65) Prior Publication Data

US 2024/0355308 A1    Oct. 24, 2024

(30) Foreign Application Priority Data

Apr. 24, 2023    (JP) ................................. 2023-070811

(51) Int. Cl.
*G09G 5/10* (2006.01)
*G06T 7/70* (2017.01)
*G06V 40/16* (2022.01)

(52) U.S. Cl.
CPC .................. *G09G 5/10* (2013.01); *G06T 7/70* (2017.01); *G06V 40/161* (2022.01); *G09G 2320/0626* (2013.01)

(58) Field of Classification Search
CPC ............. G09G 5/10; G09G 2320/0626; G09G 2354/00; G09G 2330/021; G06T 7/70;
(Continued)

(56) References Cited

U.S. PATENT DOCUMENTS

2012/0236045 A1\* 9/2012 Tamura ................. G06F 3/1423
345/690
2022/0155858 A1\* 5/2022 Huang ............... H04N 21/4854
(Continued)

FOREIGN PATENT DOCUMENTS

JP    H11-288259 A    10/1999
JP    2009-258865 A    11/2009
(Continued)

*Primary Examiner* — Rodney Amadiz
(74) *Attorney, Agent, or Firm* — Osha Bergman Watanabe & Burton LLP

(57) ABSTRACT

An information processing apparatus includes: a memory which temporarily stores image data of an image captured by an imaging unit; a processor which processes the image data stored in the memory; an internal display; and a connection unit which connects to an external display. The processor performs: face detection processing to process the image data of the image stored in the memory in order to detect a face area with a face captured therein and an orientation of the face from the image; brightness reduction processing to reduce screen brightness of the internal display based on the orientation of the face toward the internal display detected by the face detection processing; and brightness reduction control processing to enable the brightness reduction processing or to disable the brightness reduction processing.

10 Claims, 7 Drawing Sheets

(58) Field of Classification Search
CPC .. G06V 40/161; G06V 40/165; G06V 10/141; G06F 3/012; G06F 1/3231; G06F 1/3265; H04N 23/611
See application file for complete search history.

(56) References Cited

U.S. PATENT DOCUMENTS

2022/0221926 A1    7/2022  Khosrowpour et al.
2022/0382359 A1*  12/2022  Kosugi ................. G06F 1/3231
2022/0413604 A1*  12/2022  Kim ..................... G06V 20/597

FOREIGN PATENT DOCUMENTS

| | | |
|---|---|---|
| JP | 2013-182526 A | 9/2013 |
| JP | 2016-148895 A | 8/2016 |
| JP | 2022-183484 A | 12/2022 |
| KR | 2018-0123907 A | 11/2018 |
| WO | 2013/046983 A1 | 4/2013 |

* cited by examiner

INFORMATION PROCESSING APPARATUS WITH BRIGHTNESS REDUCTION PROCESSING AND CONTROL METHOD FOR BRIGHTNESS REDUCTION PROCESSING

CROSS-REFERENCE TO RELATED APPLICATIONS

This application claims priority to Japanese Patent Application No. 2023-070811 filed on Apr. 24, 2023, the contents of which are hereby incorporated herein by reference in their entirety.

TECHNICAL FIELD

The present invention relates to an information processing apparatus and a control method.

BACKGROUND

There is an apparatus which makes a transition to a usable state when a person approaches or to a standby state in which functions except some of the functions are stopped when the person moves away. For example, in Japanese Unexamined Patent Application Publication No. 2016-148895, it is detected whether a person is approaching or has moved away using an infrared sensor.

In recent years, with the development of computer vision and the like, detection accuracy when detecting a face from an image has been getting higher. Therefore, person detection by face detection is also performed instead of person detection by the infrared sensor. In the person detection by face detection, since the orientation of a face can also be detected in addition to simply detecting a person, control according to the orientation of the face (facing forward, facing sideways, or the like) can also be performed. For example, there is an information processing apparatus (for example, a PC: Personal Computer) which reduces the screen brightness of a display to save power when the face is not facing forward (the direction of the apparatus) because it can be determined that a user is not using the information processing apparatus.

For example, a laptop (clamshell) PC may be used by being connected to an external display. Conventionally, brightness reduction processing to reduce the screen brightness according to the orientation of the face described above when the external display is connected has not been performed. However, as it becomes possible to detect the orientation of the face in detail, it is desired to apply brightness reduction processing even when the external display is connected.

Here, in the case where no external display is connected, when there is user input to an HID (Human Interface Device) such as a keyboard (HID input), since it can be determined that the user is using the PC even if the user is not facing forward (the direction of the PC), the brightness reduction processing according to the orientation of the face described above has been conventionally disabled. However, in the case where the external display is connected, when the user is using (looking at) the external display even though there is HID input, since the user is not using (not looking at) an internal display of the PC, it is desirable to keep the brightness reduction processing for the internal display of the PC enabled from the perspective of power saving and the like.

SUMMARY

One or more embodiments of the present invention provide an information processing apparatus and a control method which reduce the screen brightness of a display properly depending on the orientation of a face even when an external display is connected.

An information processing apparatus according to one or more embodiments of the present invention includes: a memory which temporarily stores image data of an image captured by an imaging unit; a processor which processes the image data stored in the memory; an internal display; and a connection unit which connects to an external display, wherein the processor performs face detection processing to process the image data of the image stored in the memory in order to detect a face area with a face captured therein and an orientation of the face from the image, brightness reduction processing to reduce the screen brightness of the internal display based on the orientation of the face toward the internal display detected by the face detection processing, and brightness reduction control processing to enable the brightness reduction processing when both of an active window and a cursor are not displayed on a screen of the internal display in a state where the external display is connected, or to disable the brightness reduction processing when either one or both of the active window and the cursor are displayed on the screen of the internal display.

The above information processing apparatus may be such that, in the brightness reduction control processing, when the brightness reduction processing is enabled in a state where the external display is not connected, the processor disables the brightness reduction processing in response to the fact that there is user input, or when both of the active window and the cursor are not displayed on the screen of the internal display in the state where the external display is connected, the processor enables the brightness reduction processing regardless of whether or not there is user input.

The above information processing apparatus may also be such that, in the brightness reduction control processing, even when either one or both of the active window and the cursor are displayed on the screen of the internal display in the state where the external display is connected, the processor will enable the brightness reduction processing if there is no user input, or disable the brightness reduction processing in response to the fact that there is user input.

The above information processing apparatus may further be such that, in the brightness reduction processing, the processor further performs external brightness reduction processing to reduce the screen brightness of the external display based on an orientation of the face toward the external display detected by the face detection processing, and in the brightness reduction control processing, the processor enables the external brightness reduction processing when both of the active window and the cursor are not displayed on a screen of the external display in the state where the external display is connected, or disables the external brightness reduction processing when either one or both of the active window and the cursor are displayed on the screen of the external display.

Further, the above information processing apparatus may be such that, in the brightness reduction control processing, when both of the active window and the cursor are not displayed on the screen of the external display in the state where the external display is connected, the processor enables the external brightness reduction processing regardless of whether or not there is user input.

Further, the above information processing apparatus may be such that, in the brightness reduction control processing, even when both of the active window and the cursor are displayed on the screen of the external display in the state where the external display is connected, the processor will enable the external brightness reduction processing if there is no user input, or disable the external brightness reduction processing in response to the fact that there is user input.

Further, an information processing apparatus according to one or more embodiments of the present invention includes: a memory which temporarily stores image data of an image captured by an imaging unit; a processor which processes the image data stored in the memory; an internal display; and a connection unit which connects to an external display, wherein the processor performs face detection processing to process the image data of the image stored in the memory in order to detect a face area with a face captured therein and an orientation of the face from the image, brightness reduction processing to reduce the screen brightness of the internal display or the external display based on the orientation of the face detected by the face detection processing, and brightness reduction control processing to enable the brightness reduction processing for a target display when both of an active window and a cursor are not displayed on a screen of the target display targeted for the brightness reduction processing between the internal display and the external display in a state where the external display is connected, or to disable the brightness reduction processing for the target display when either one or both of the active window and the cursor are displayed on the screen of the target display.

The above information processing apparatus may also be such that, in the brightness reduction control processing, when both of the active window and the cursor are not displayed on the screen of the target display in the state where the external display is connected, the processor enables the brightness reduction processing regardless of whether or not there is user input.

The above information processing apparatus may further be such that, in the brightness reduction control processing, even when either one or both of the active window and the cursor are displayed on the screen of the target display in the state where the external display is connected, the processor will enable the brightness reduction processing if there is no user input, or disable the brightness reduction processing in response to the fact that there is user input.

Further, a control method according to one or more embodiments of the present invention is a control method for an information processing apparatus including: a memory which temporarily stores image data of an image captured by an imaging unit; a processor which processes the image data stored in the memory; an internal display; and a connection unit which connects to an external display, the control method including: a step of causing the processor to perform face detection processing to process the image data of the image stored in the memory in order to detect a face area with a face captured therein and an orientation of the face from the image; a step of causing the processor to perform brightness reduction processing to reduce the screen brightness of the internal display based on the orientation of the face toward the internal display detected by the face detection processing; and a step of causing the processor to perform brightness reduction control processing to enable the brightness reduction processing when both of an active window and a cursor are not displayed on a screen of the internal display in a state where the external display is connected, or to disable the brightness reduction processing when either one or both of the active window and the cursor are displayed on the screen of the internal display.

Further, a control method according to one or more embodiments of the present invention is a control method for an information processing apparatus including: a memory which temporarily stores image data of an image captured by an imaging unit; a processor which processes the image data stored in the memory; an internal display; and a connection unit which connects to an external display, the control method including: a step of causing the processor to perform face detection processing to process the image data of the image stored in the memory in order to detect a face area with a face captured therein and an orientation of the face from the image; a step of causing the processor to perform brightness reduction processing to reduce the screen brightness of the internal display or the external display based on the orientation of the face detected by the face detection processing; and a step of causing the processor to perform brightness reduction control processing to enable the brightness reduction processing for a target display when both of an active window and a cursor are not displayed on a screen of the target display targeted for the brightness reduction processing between the internal display and the external display in a state where the external display is connected, or to disable the brightness reduction processing for the target display when either one or both of the active window and the cursor are displayed on the screen of the target display.

The above-described aspects of the present invention can improve responsiveness when detecting the face orientation to control the screen brightness of the display unit.

DETAILED DESCRIPTION OF THE INVENTION

Embodiments of the present invention will be described below with reference to the accompanying drawings.

[Overview]

First, the overview of an information processing apparatus according to one or more embodiments will be described.

Figure 1:
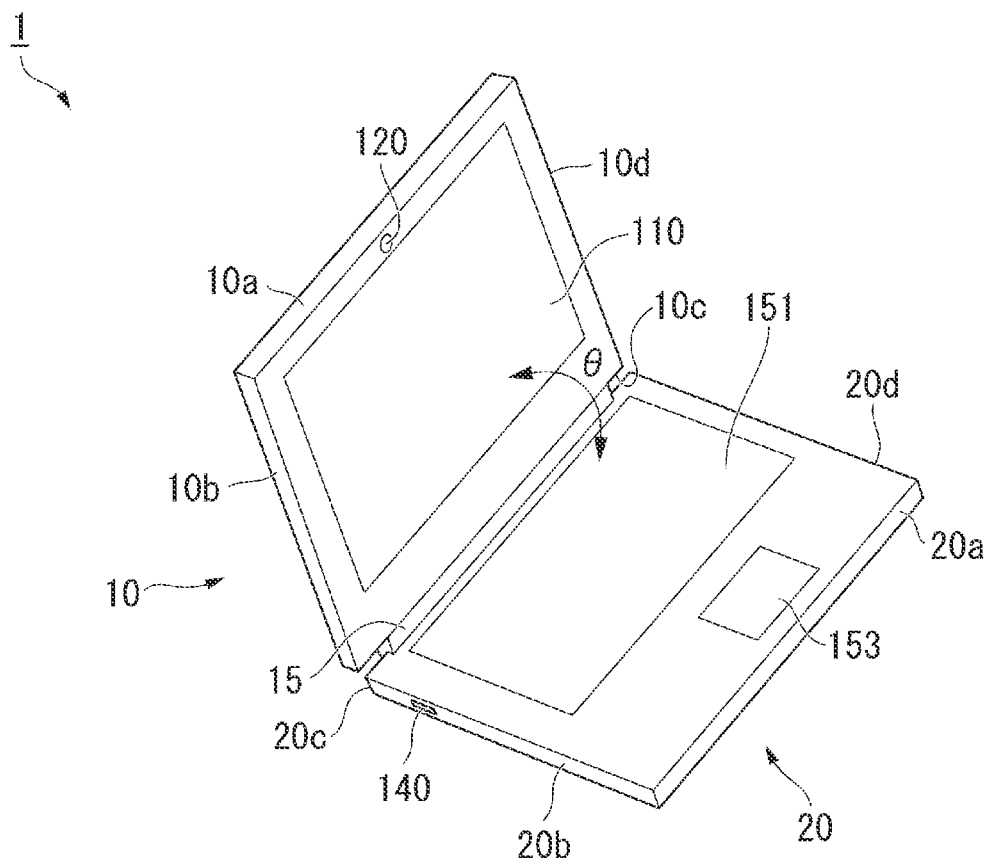
FIG. 1 is a perspective view illustrating a configuration example of the appearance of an information processing apparatus according to one or more embodiments.

FIG. 1 is a perspective view illustrating a configuration example of the appearance of an information processing apparatus 1 according to one or more embodiments.

The information processing apparatus 1 is, for example, a laptop (clamshell) PC (Personal Computer). The information processing apparatus 1 includes a first chassis 10, a second chassis 20, and a hinge mechanism 15. The first chassis 10 and the second chassis 20 are coupled by using the hinge mechanism 15. The first chassis 10 is rotatable around an axis of rotation formed by the hinge mechanism 15 relative to the second chassis 20. An open angle by the rotation between the first chassis 10 and the second chassis 20 is denoted by "θ" in FIG. 1.

The first chassis 10 is also called A cover or a display chassis. The second chassis 20 is also called C cover or a system chassis. In the following description, side faces on which the hinge mechanism 15 is provided among side faces of the first chassis 10 and the second chassis 20 are referred to as side faces 10c and 20c, respectively. Among the side faces of the first chassis 10 and the second chassis 20, faces opposite to the side faces 10c and 20c are referred to as side faces 10a and 20a, respectively. In this figure, the direction from the side face 20a toward the side face 20c is referred to as "rear," and the direction from the side face 20c to the side face 20a is referred to as "front." The right hand and left hand in the rearward direction are referred to as "right" and "left," respectively. Left side faces of the first chassis 10 and the second chassis 20 are referred to as side faces 10b and 20b, respectively, and right side faces thereof are referred to as side faces 10d and 20d, respectively. Further, a state where the first chassis 10 and the second chassis 20 overlap each other and are completely closed (a state of open angle θ=0°) is referred to as a "closed state." The faces of the first chassis 10 and the second chassis 20 on the face-to-face sides in the closed state are referred to as respective "inner faces," and the faces opposite to the inner faces are referred to as "outer faces." Further, a state opposite to the closed state, where the first chassis 10 and the second chassis 20 are open, is referred to as an "open state."

The appearance of the information processing apparatus 1 in FIG. 1 illustrates an example of the open state. The open state is a state where the side face 10a of the first chassis 10 and the side face 20a of the second chassis 20 are separated. In the open state, the respective inner faces of the first chassis 10 and the second chassis 20 appear. The open state is one of states when a user uses the information processing apparatus 1, and the information processing apparatus 1 is often used in a state where the open angle is typically about θ=100° to 130°. Note that the range of open angles θ to be the open state can be set arbitrarily according to the range of angles rotatable by the hinge mechanism 15, or the like.

A display unit 110 is provided on the inner face of the first chassis 10. The display unit 110 is configured to include a liquid crystal display (LCD) or an organic EL (Electro Luminescence) display, and the like. Further, an imaging unit 120 is provided in a peripheral area of the display unit 110 on the inner face of the first chassis 10. For example, the imaging unit 120 is arranged on the side of the side face 10a in the peripheral area of the display unit 110. Note that the position at which the imaging unit 120 is arranged is just an example, and it may be elsewhere as long as the imaging unit 120 can face a direction to face a display screen of the display unit 110.

In the open state, the imaging unit 120 images a predetermined imaging range in a direction to face the display screen of the display unit 110 (that is, in front of the information processing apparatus 1). The predetermined imaging range is a range of angles of view defined by an image sensor included in the imaging unit 120 and an optical lens provided in front of the imaging surface of the image sensor. For example, the imaging unit 120 can capture an image including a person (user) present in front of the information processing apparatus 1.

Further, a power button 140 is provided on the side face 20b of the second chassis 20. The power button 140 is an operating element used by the user to give an instruction to power on or power off, make a transition from a standby state to a normal operating state, make a transition from the normal operating state to the standby state, or the like. The normal operating state is an operating state of a system capable of executing processing without being particularly limited, which corresponds, for example, to S0 state defined in the ACPI (Advanced Configuration and Power Interface) specification.

The standby state is a state in which at least part of system processing is limited and power consumption is lower than that in the normal operating state. For example, the standby state may be the standby state or a sleep state, Modern Standby in Windows (registered trademark), or a state corresponding to S3 state (sleep state) defined in the ACPI specification. Further, a state in which at least the display of the display unit appears to be OFF (screen OFF), or a screen lock state may also be included as the standby state. The screen lock is a state in which an image preset to make a content being processed invisible (for example, an image for the screen lock) is displayed on the display unit, that is, an unusable state until the lock is released (for example, until the user is authenticated).

Further, a keyboard 151 and a touch pad 153 are provided on the inner face of the second chassis 20 as an input device to accept user operation input. Note that a touch sensor may also be provided as the input device instead of or in addition to the keyboard 151 and the touch pad 153, or a mouse and an external keyboard may be connected. When the touch sensor is provided, an area corresponding to the display surface of the display unit 110 may be constructed as a touch panel to accept operations. Further, a microphone used to input voice may be included in the input device.

Note that in the closed state where the first chassis 10 and the second chassis 20 are closed, the display unit 110 and the imaging unit 120 provided on the inner face of the first chassis 10, and the keyboard 151 and the touch pad 153 provided on the inner face of the second chassis 20 are covered with each other's chassis faces, respectively, and put in a state of being disabled from fulfilling the functions.

The information processing apparatus 1 executes HPD (Human Presence Detection) processing to detect a person present in front of the information processing apparatus 1 based on a captured image captured by the imaging unit 120.

Figure 2:
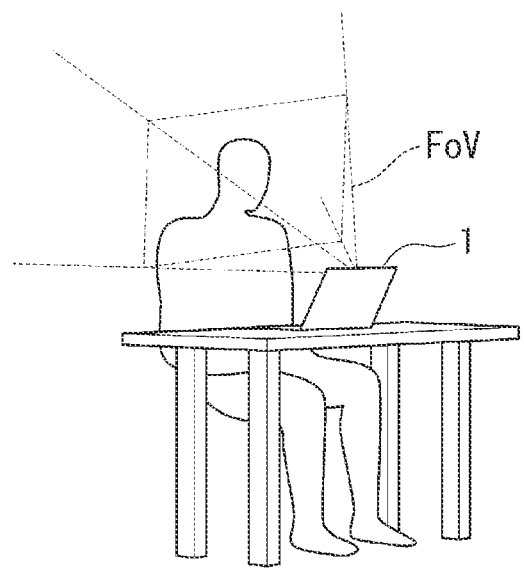
FIG. 2 is a diagram illustrating an example of a person detection range of the information processing apparatus according to one or more embodiments.

FIG. 2 is a diagram illustrating an example of a person detection range of the information processing apparatus 1 according to one or more embodiments. In the illustrated example, a detection range FoV (Field of View: detection viewing angle) in front of the information processing apparatus 1 is a person-detectable range.

For example, the information processing apparatus 1 detects a face area with a face captured therein from a captured image captured by the imaging unit 120 to determine whether or not a person (user) is present in front of the information processing apparatus 1. The detection range FoV corresponds to an angle of view at which the information processing apparatus 1 captures images. When the face area is detected from the captured image, the information processing apparatus 1 determines that the person (user) is present. On the other hand, when any face area is not detected from the captured image, the information processing apparatus 1 determines that no person (user) is present.

The information processing apparatus 1 controls the operating state of the system of the information processing apparatus 1 depending on the presence or absence of the person (user) by the HPD processing. For example, when the person (user) is present in front of the information processing apparatus 1, the information processing apparatus 1 controls the operating state to the normal operating state, while when no person (user) is present in front of the information processing apparatus 1, the information processing apparatus 1 controls the operating state to the standby state.

Further, when the person (user) is present in front of the information processing apparatus 1, the information processing apparatus 1 detects the orientation of a face of the person (user). For example, the information processing apparatus 1 determines whether or not the face of the person (user) is facing the direction of the information processing apparatus 1 (the direction of the display unit 110 and the imaging unit 120). The orientation of the face here is an orientation corresponding to the rotation angle of the face to the left and right. In the following, a state where the face is facing the direction of the information processing apparatus 1 (the direction of the display unit 110 and the imaging unit 120) is assumed to be a state where the face is facing forward. Further, a state where the face is facing to the right or left with respect to the front is assumed to be a state where the face is facing sideways.

Figure 3:
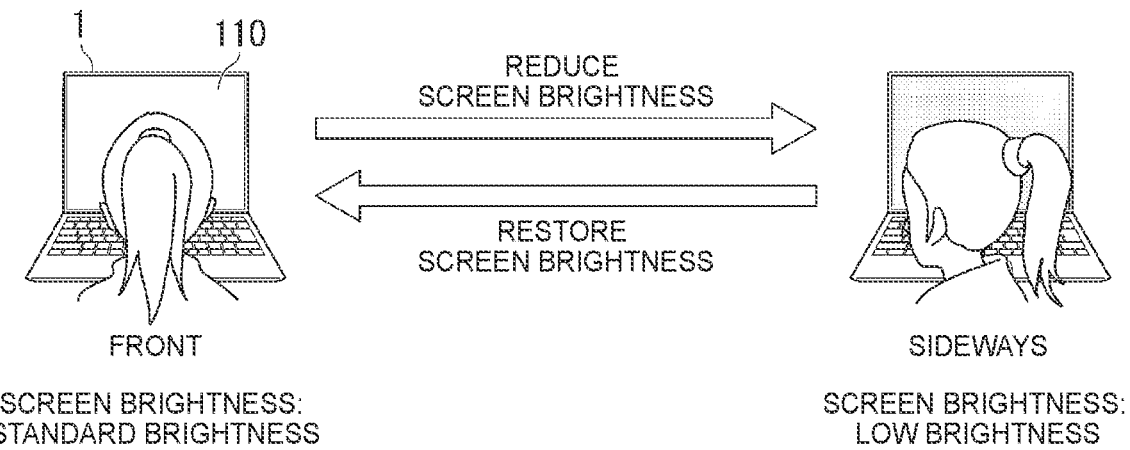
FIG. 3 is a schematic diagram for describing screen brightness control depending on a face orientation according to one or more embodiments.

FIG. 3 is a schematic diagram for describing screen brightness control depending on the face orientation according to one or more embodiments. As illustrated in FIG. 3, the information processing apparatus 1 executes brightness reduction processing to reduce the screen brightness of the display unit 110 depending on the face orientation of the person (user). Specifically, when the face is not facing forward (for example, when the face is facing sideways), the information processing apparatus 1 reduces the screen brightness of the display unit 110 to save power. Further, when the face turns forward again, the information processing apparatus 1 restores the screen brightness to the original screen brightness before being reduced.

In the following, the original screen brightness before being reduced is called "standard brightness." Further, the screen brightness reduced from the standard brightness when the face is not facing forward (for example, when the face turns sideways) is called "low brightness." The low brightness is a brightness at least lower than the standard brightness. The lower the brightness, the more power will be saved. For example, the low brightness may be a brightness of about 0 to 10% of the standard brightness. Note that the state where the face is not facing forward includes a state where the face is facing up or down.

Here, the information processing apparatus 1 can be connected to an external display. For example, in a case where the external display is not connected, when there is user input to an HID (Human Interface Device) such as the keyboard 151, the touch pad 153, or the like (hereinafter called "HID input"), the information processing apparatus 1 can determine that the user is using the information processing apparatus 1 even if the user is not facing forward (the direction of the PC). Therefore, when there is HID input, the information processing apparatus 1 disables the brightness reduction processing according to the face orientation described above.

On the other hand, in a case where the external display is connected, even when there is HID input, since there is a possibility that the user is looking at (paying attention to) the external display, it may be desirable to keep the brightness reduction processing enabled without disabling the brightness reduction processing from the perspective of power saving and the like. Therefore, when the external display is connected, the information processing apparatus 1 differentiates the control of whether to enable or disable the brightness reduction processing depending on whether an active window and a cursor are displayed on the external display screen or the internal display screen.

Note that the active window refers to a window being operated or selected. Further, the cursor refers to an icon (such as a pictorial pattern or a mark) or a symbol indicative of an operation position or an input position by a pointing device such as a mouse or a touch pad. In other words, the fact that the active window and the cursor are displayed can be assumed to be a state where the user is looking at (paying attention to) the display screen.

Figure 4:
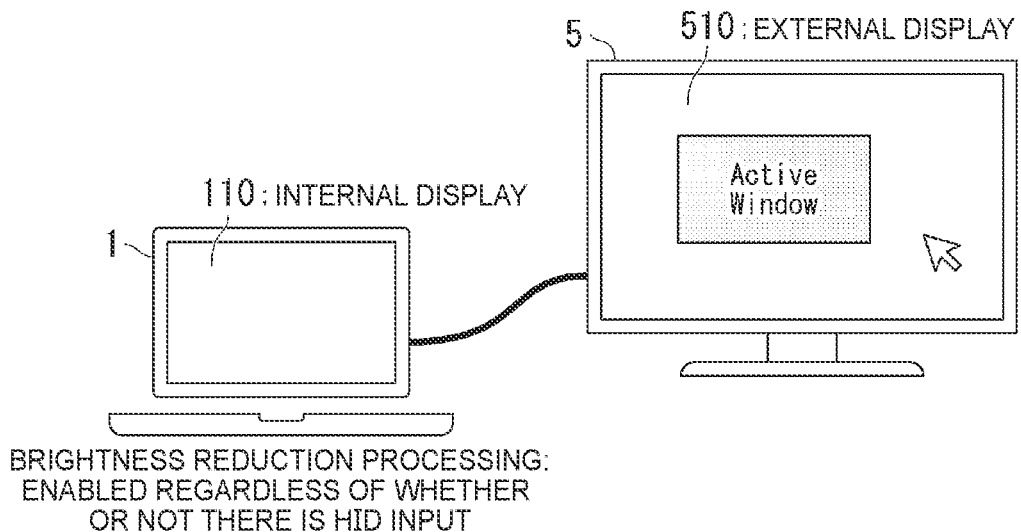
FIG. 4 is a schematic diagram illustrating a first example of a state in which the information processing apparatus according to one or more embodiments is connected to an external display and used.

FIG. 4 is a schematic diagram illustrating a first example of a state in which the information processing apparatus 1 according to one or more embodiments is connected to an external display and used. The information processing apparatus 1 is connected to an external display device 5 configured to include a display unit 510 as the external display. As the connection method, any connection method using HDMI (registered trademark), USB Type-C, or a display port can be applied. Note that the information processing apparatus 1 may also be connected wirelessly to the external display device 5.

In the following description, the display unit 110 as the internal display included in the information processing apparatus 1 is simply called the "internal display." On the other hand, the display unit 510 as the external display included in the external display device 5 is simply called the "external display."

In the example illustrated in FIG. 4, the active window and the cursor are displayed on the screen of the external display, and neither the active window nor the cursor is displayed on the screen of the internal display. In this case, it can be assumed that the user is looking at (paying attention to) the external display. Therefore, when both of the active window and the cursor are not displayed on the screen of the internal display, the information processing apparatus 1 enables the brightness reduction processing for the internal display regardless of whether or not there is HID input (that is, even when there is HID input).

Figure 5:
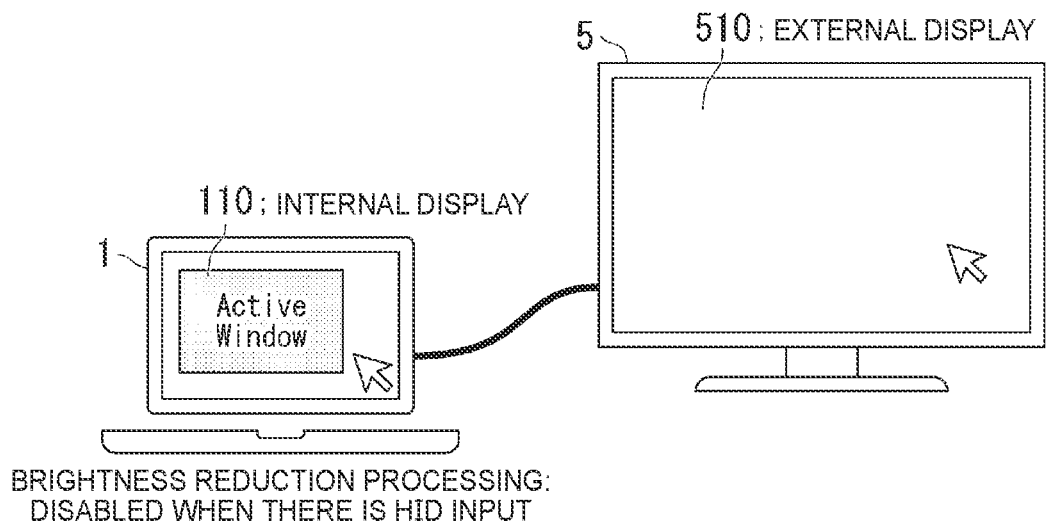
FIG. 5 is a schematic diagram illustrating a second example of the state in which the information processing apparatus according to one or more embodiments is connected to the external display and used.

Referring next to FIG. 5, a case when the active window and the cursor are displayed on the screen of the internal display will be described. FIG. 5 is a schematic diagram illustrating a second example of the state in which the information processing apparatus 1 according to one or more embodiments is connected to the external display and used.

In the example illustrated in FIG. 5, the active window and the cursor are displayed on the screen of the internal display, and both of the active window and the cursor are not displayed on the screen of the external display. In this case, it can be assumed that the user is looking at (paying attention to) the internal display. Therefore, when either one or both of the active window and the cursor are displayed on the screen of the internal display, the information processing apparatus 1 disables the brightness reduction processing for the internal display in response to the fact that there is HID input.

The configurations of the information processing apparatus 1 according to one or more embodiments will be described in detail below.

[Hardware Configuration of Information Processing Apparatus]

Figure 6:
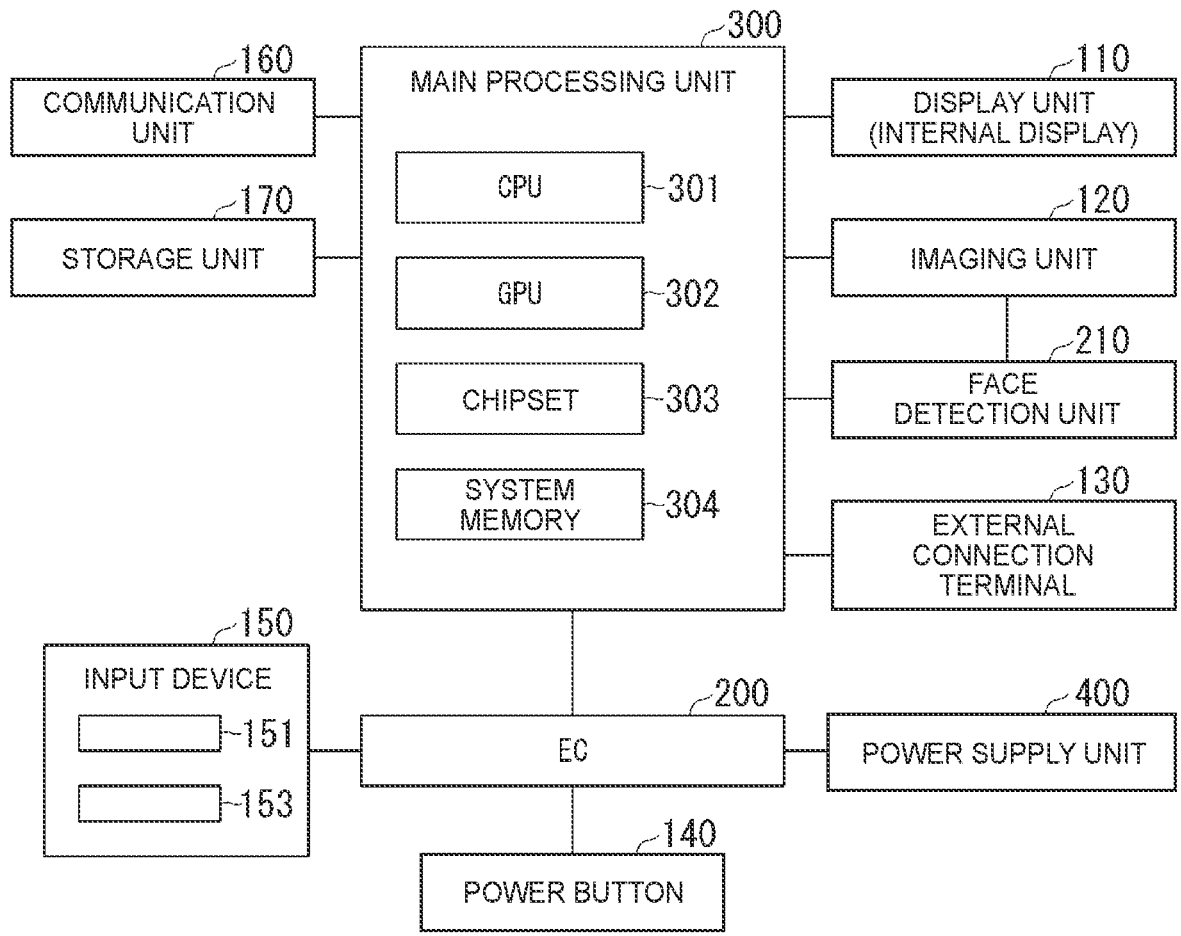
FIG. 6 is a schematic block diagram illustrating an example of the hardware configuration of the information processing apparatus according to one or more embodiments.

FIG. 6 is a schematic block diagram illustrating an example of the hardware configuration of the information processing apparatus 1 according to one or more embodiments. In FIG. 6, components corresponding to respective units in FIG. 1 are given the same reference numerals. The information processing apparatus 1 is configured to include the display unit 110, the imaging unit 120, an external connection terminal 130, the power button 140, an input device 150, a communication unit 160, a storage unit 170, an EC (Embedded Controller) 200, a face detection unit 210, a main processing unit 300, and a power supply unit 400.

The display unit 110 (internal display) displays display data (images) generated based on system processing executed by the main processing unit 300, processing of an application program running on the system processing, and the like.

The imaging unit 120 captures an image of an object within the predetermined imaging range (angle of view) in the direction (frontward) to face the inner face of the first chassis 10, and outputs the captured image to the main processing unit 300 and the face detection unit 210. For example, the imaging unit 120 includes a visible light camera (RGB camera) for capturing an image using visible light and an infrared camera (IR camera) for capturing an image using infrared light.

Note that the imaging unit 120 may be configured to include either one of the visible light camera and the infrared camera, or may be configured to include both the visible light camera and the infrared camera.

The external connection terminal 130 is a connection terminal used to connect to the external display device 5. For example, the external connection terminal 130 is an HDMI (registered trademark) terminal, a USB Type-C terminal, a display port, or the like.

The power button 140 outputs, to the EC 200, an operation signal according to a user operation. The input device 150 is an HID (input unit) for accepting user input, which is configured to include, for example, the keyboard 151 and the touch pad 153. In response to accepting operations on the keyboard 151 and the touch pad 153, the input device 150 outputs, to the EC 200, operation signals indicative of operation contents.

The communication unit 160 is connected to other devices communicably through a wireless or wired communication network to transmit and receive various data. For example, the communication unit 160 is configured to include a wired LAN interface such as Ethernet (registered trademark), a wireless LAN interface such as Wi-Fi (registered trademark), and the like.

The storage unit 170 is configured to include storage media, such as an HDD (Hard Disk Drive) or an SDD (Solid State Drive), a RAM, and a ROM. The storage unit 170 stores an OS, device drivers, various programs such as applications, and various data acquired by the operation of the programs.

The power supply unit 400 supplies power to each unit according to the operating state of each unit of the information processing apparatus 1. The power supply unit 400 includes a DC (Direct Current)/DC converter. The DC/DC converter converts the voltage of DC power, supplied from an AC (Alternate Current)/DC adapter or a battery (battery pack), to a voltage required for each unit. The power with the voltage converted by the DC/DC converter is supplied to each unit through each power system. For example, the power supply unit 400 supplies power to each unit through each power system based on a control signal input from the EC 200.

The EC 200 is a microcomputer configured to include a CPU (Central Processing Unit), a RAM (Random Access Memory), a ROM (Read Only Memory), an I/O (Input/Output) logic circuit, and the like. The CPU of the EC 200 reads a control program (firmware) prestored in the own ROM, and executes the read control program to fulfill the functionality. The EC 200 operates independently of the main system processing unit 300 to control the operation of the main processing unit 300 and manage the operating state of the main processing unit 300. Further, the EC 200 is connected to the power button 140, the input device 150, the power supply unit 400, and the like.

For example, the EC 200 communicates with the power supply unit 400 to acquire information on a battery state (remaining battery capacity, and the like) from the power supply unit 400 and to output, to the power supply unit 400, a control signal or the like in order to control the supply of power according to the operating state of each unit of the information processing apparatus 1. Further, the EC 200 acquires operation signals from the power button 140 and the input device 150, and outputs, to the main processing unit 300, an operation signal related to processing of the main processing unit 300 among the acquired operation signals.

The face detection unit 210 is configured to include a processor for processing image data of a captured image captured by the imaging unit 120. The face detection unit 210 acquires the image data of the captured image captured by the imaging unit 120, and temporarily stores the acquired image data in a memory. The memory in which the image data is stored may be a system memory 304, or an unillustrated memory in the face detection unit 210.

For example, the face detection unit 210 processes the image data of the captured image acquired from the imaging unit 120 to perform face detection processing for detecting a face area (an area of a face image) from the captured image, detecting the orientation of a face of the face image in the detected face area, and the like. As the face detection method, any detection method using a face detection algorithm for detecting a face based on facial feature information, trained data (learned model) subjected to machine learning based on the facial feature information, a face detection library, or the like can be applied. Further, the orientation of a face is detected as an angle from a reference direction, for example, by setting the reference direction to 0°. The reference direction is, for example, the direction of the information processing apparatus 1 (the direction of the display unit 110 and the imaging unit 120). The time when the face is facing the reference direction is detected as a state where the face is facing toward the information processing apparatus 1 (the display unit 110 and the imaging unit 120).

Further, in the face detection processing, the face detection unit 210 performs face direction determination processing to determine whether or not the face is facing forward. The face detection unit 210 determines whether or not the face is facing forward based on the orientation of the face detected from the captured image, and transmits the determination result to the main processing unit 300. Further, the face detection unit 210 controls a detection frame rate when performing the face detection processing.

The main processing unit 300 is configured to include a CPU (Central Processing Unit) 301, a GPU (Graphic Processing Unit) 302, a chipset 303, and the system memory 304, where processing of various application programs is executable on the OS (Operating System) by system processing based on the OS.

The CPU 301 is a processor which executes processing based on a BIOS program, processing based on the OS program, processing based on application programs running on the OS, and the like. For example, the CPU 301 executes boot processing to boot the system from the standby state and make the transition to the normal operating state, sleep processing to make the transition from the normal operating state to the standby state, and the like. Further, the CPU 301 executes screen brightness control processing to reduce the screen brightness of the display unit 110 (internal display) based on the result of the face detection processing by the face detection unit 210 described above, and the like.

The GPU 302 is connected to the display unit 110 (internal display). The GPU 302 executes image processing under the control of the CPU 301 to generate display data. The GPU 302 outputs the generated display data to the display unit 110 (internal display).

The chipset 303 has a function as a memory controller, a function as an I/O controller, and the like. For example, the chipset 303 controls reading data from and writing data to the system memory 304, the storage unit 170, and the like by the CPU 301 and the GPU 302. Further, the chipset 303 controls input/output of data from the communication unit 160, the display unit 110 (internal display), and the EC 200. Further, the chipset 303 has a function as a sensor hub. For example, the chipset 303 acquires the detection result by the face detection processing acquired from the face detection unit 210, and outputs the detection result to the CPU 301.

The system memory 304 is used as a reading area of a program executed by the CPU 301 and a working area to write processed data. Further, the system memory 304 temporarily stores image data of a captured image captured by the imaging unit 120.

Note that the CPU 301, the GPU 302, and the chipset 303 may be integrated as one processor, or some or each of them may be configured as an individual processor, respectively. For example, in the normal operating state, the CPU 301, the GPU 302, and the chipset 303 are all operating, but in the standby state, only at least some of the functions of the chipset 303 are operating.

[Functional Configuration of Information Processing Apparatus]

Next, the functional configuration of the information processing apparatus 1 to perform screen brightness control depending on the face orientation will be described in detail.

Figure 7:
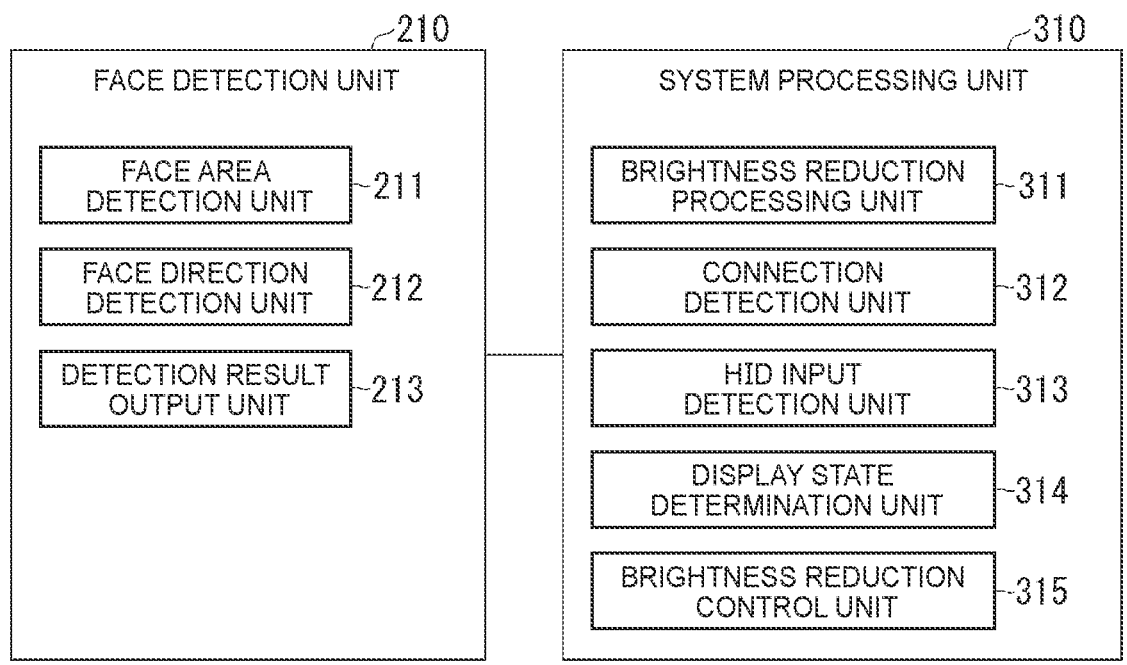
FIG. 7 is a schematic block diagram illustrating an example of the functional configuration of the information processing apparatus according to one or more embodiments.

FIG. 7 is a schematic block diagram illustrating an example of the functional configuration of the information processing apparatus 1 according to one or more embodiments. The information processing apparatus 1 includes the face detection unit 210 and a system processing unit 310. The face detection unit 210 corresponds to the face detection unit 210 in FIG. 6, and includes a face area detection unit 211, a face direction detection unit 212, and a detection result output unit 213 as functional components to perform the face detection processing.

The face area detection unit 211 processes image data of a captured image acquired from the imaging unit 120 to detect a face area with a face captured therein (an area of a face image) from the captured image.

The face direction detection unit 212 detects an orientation of the face (face angle) captured in the face area detected from the captured image by the face area detection unit 211. For example, the face direction detection unit 212 detects the face angle in a range of ±90° by setting a face angle when the face is facing forward to 0°.

The detection result output unit 213 outputs information based on the detection result of the face angle detected by the face direction detection unit 212. For example, when determining that the face is facing forward (or the face turned forward) based on the face angle detected by the face direction detection unit 212, the detection result output unit 213 outputs, to the system processing unit 310, "Attention" information as information indicating that the user is looking at (paying attention to) the information processing apparatus 1.

On the other hand, when determining that the face is not facing forward based on the face angle detected by the face direction detection unit 212, the detection result output unit 213 outputs, to the system processing unit 310, "No Attention" information as information indicating that the user is not looking at (paying attention to) the information processing apparatus 1.

Note that the detection result output unit 213 may also determine whether or not the user is facing the direction of the external display device 5 based on the face angle detected by the face direction detection unit 212.

The system processing unit 310 is a functional component implemented by the CPU 301 or the chipset 303 executing the system program or a program for HPD processing. For example, the system processing unit 310 includes a brightness reduction processing unit 311, a connection detection unit 312, an HID input detection unit 313, a display state determination unit 314, and a brightness reduction control unit 315 as functional components implemented by executing the OS program.

The brightness reduction processing unit 311 executes brightness reduction processing to reduce the screen brightness of the display unit 110 (internal display) based on the face orientation detected by the face detection unit 210. For example, in the normal operating state, when acquiring the "No Attention" information from the face detection unit 210, the brightness reduction processing unit 311 controls the screen brightness to the low brightness. Namely, the brightness reduction processing unit 311 reduces the screen brightness when the face orientation detected by the face detection unit 210 changes from a state where the face is facing forward to a state where the face is not facing forward (for example, where the face is facing sideways).

Further, when acquiring the "Attention" information from the face detection unit 210 in such a state that the screen brightness is controlled to the low brightness, the brightness reduction processing unit 311 restores the screen brightness to the standard brightness. Namely, when determining that the face detected by the face detection unit 210 is facing forward after the screen brightness is reduced, the brightness reduction processing unit 311 restores the screen brightness to the standard brightness before being reduced.

Further, the brightness reduction processing unit 311 includes a timer for measuring time to measure a waiting time from the time when the "No Attention" information is acquired from the face detection unit 210 in the normal operating state until the screen brightness is controlled to the low brightness. For example, when acquiring the "Attention" information before a predetermined waiting time elapses after the "No Attention" information is acquired, the brightness reduction processing unit 311 keeps the standard brightness without controlling the screen brightness to the low brightness. On the other hand, when not acquiring the "Attention" information during the predetermined waiting time after the "No Attention" information is acquired, the brightness reduction processing unit 311 controls the screen brightness to the low brightness. This makes it possible to prevent the screen brightness from being controlled to the low brightness when the user just looks away a little bit while using the information processing apparatus 1. The predetermined waiting time is preset, for example, to 10 seconds. Note that this predetermined waiting time may also be settable by the user.

The connection detection unit 312 detects the connection to the external display device 5 connected through the external connection terminal 130. The connection detection unit 312 outputs, to the display state determination unit 314 and the brightness reduction control unit 315, the detection result of whether or not the connection to the external display device 5 is established.

The HID input detection unit 313 detects HID input to the keyboard 151 or the touch pad 153. For example, the HID input detection unit 313 detects the HID input through the EC 200 to which operation signals from the keyboard 151 and the touch pad 153 are input. Note that the HID input is not limited to input to the keyboard 151 or the touch pad 153, and it may also be input using an external keyboard or a mouse, or voice input to an unillustrated microphone. When detecting the HID input, the HID input detection unit 313 outputs, to the brightness reduction control unit 315, information indicating that the HID input is detected.

When it is determined by the connection detection unit 312 that the external display device 5 is connected through the external connection terminal 130, the display state determination unit 314 determines whether the active window and the cursor are displayed on the screen of the internal display or on the screen of the external display. The display state determination unit 314 outputs the determination result to the brightness reduction control unit 315.

Based on the detection result of the connection detection unit 312, the detection result of the HID input detection unit 313, and the determination result of the display state determination unit 314, the brightness reduction control unit 315 controls the brightness reduction processing by the brightness reduction processing unit 311 to enabled or disabled.

For example, when the brightness reduction processing is enabled in such a state that the external display is not connected, the brightness reduction control unit 315 disables the brightness reduction processing in response to the fact that there is HID input. A processing mode to disable the brightness reduction processing in response to the fact that there is HID input when the external display is not connected is called a "first brightness reduction processing mode" (normal brightness reduction processing mode).

On the other hand, when both of the active window and the cursor are not displayed on the screen of the internal display (display unit 110) in such a state that the external display is connected, the brightness reduction control unit 315 enables the brightness reduction processing. For example, when both the active window and the cursor are not displayed on the screen of the internal display (display unit 110) in the state where the external display is connected, the brightness reduction control unit 315 enables the brightness reduction processing regardless of whether or not there is HID input. A processing mode to enable the brightness reduction processing regardless of whether or not there is HID input in the state where the external display is connected is called a "second brightness reduction processing mode."

Further, in a case where either one or both of the active window and the cursor are displayed on the screen of the internal display (display unit 110) in the state where the external display is connected, the brightness reduction control unit 315 enables the brightness reduction processing when there is no HID input, or disables the brightness reduction processing in response to the fact that there is HID input. In other words, when either one or both of the active window and the cursor are displayed on the screen of the internal display (display unit 110) in the state where the external display is connected, the brightness reduction control unit 315 executes the brightness reduction processing in the first brightness reduction processing mode in the same way as the state where the external display is not connected.

Note that when either one or both of the active window and the cursor are displayed on the screen of the internal display (display unit 110), the brightness reduction control unit 315 may disable the brightness reduction processing regardless of whether or not there is HID input.

[Operation of Processing]

Figure 8:
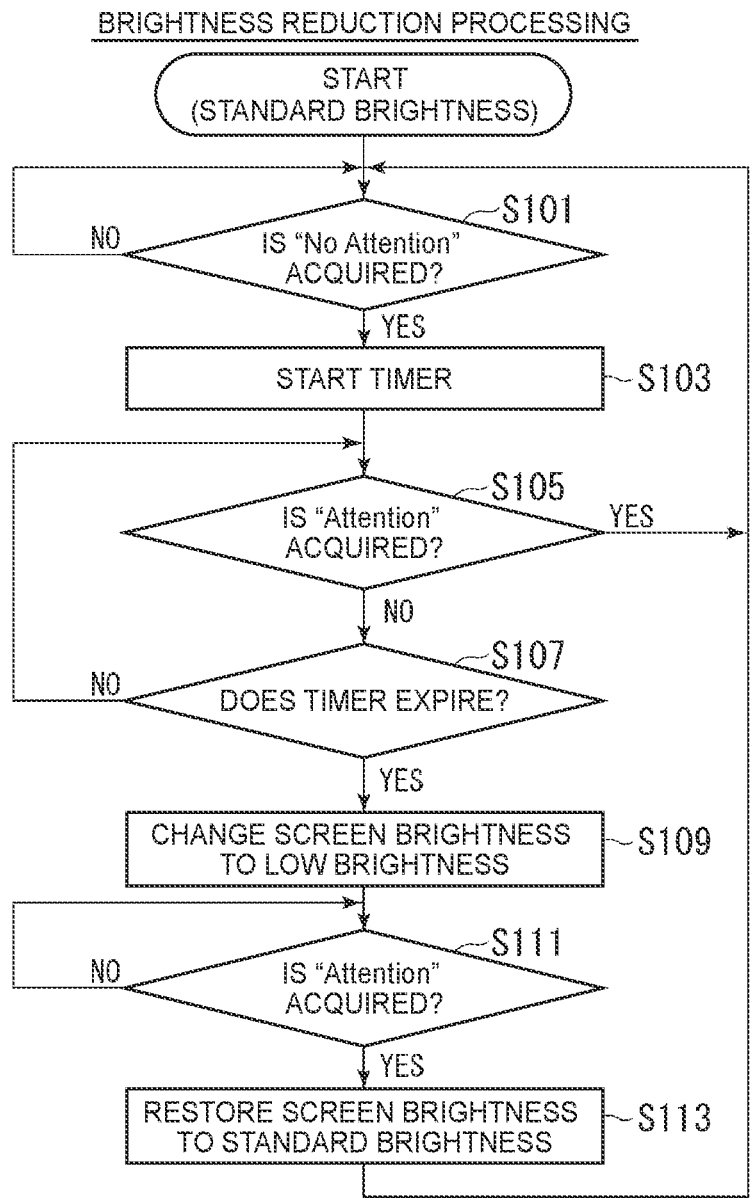
FIG. 8 is a flowchart illustrating an example of brightness reduction processing according to one or more embodiments.

Referring next to FIG. 8, the operation of brightness reduction processing executed by the brightness reduction processing unit 311 will be described. FIG. 8 is a flowchart illustrating an example of brightness reduction processing according to one or more embodiments. Here, it is assumed that the information processing apparatus 1 is in the normal operating state, the face of the user is facing forward, and the screen brightness is set to the standard brightness.

(Step S101) The brightness reduction processing unit 311 determines whether or not the "No Attention" information is acquired from the face detection unit 210. When determining that the "No Attention" information is not acquired (NO), the brightness reduction processing unit 311 performs the process in step S101 again. On the other hand, when determining that the "No Attention" information is acquired (YES), the brightness reduction processing unit 311 starts measuring the waiting time using the timer (step S103). Then, the brightness reduction processing unit 311 proceeds to a process in step S105.

(Step S105) The brightness reduction processing unit 311 determines whether or not the "Attention" information is acquired from the face detection unit 210. When determining that the "Attention" information is not acquired (NO), the brightness reduction processing unit 311 proceeds to a process in step S107.

(Step S107) The brightness reduction processing unit 311 determines whether or not the waiting time (for example, 10 seconds) has elapsed (that is, whether or not the timer expires) based on the timer value. When determining that the waiting time (for example, 10 seconds) has not elapsed yet (that is, the timer does not expire yet) (step S107: NO), the brightness reduction processing unit 311 returns to the process in step S105. When determining that the "Attention" information is acquired (step S105: YES) before the waiting time (for example, 10 seconds) elapses, the brightness reduction processing unit 311 returns to the process in step S101. At this time, the timer is reset.

On the other hand, when determining in step S107 that the waiting time (for example, 10 seconds) has elapsed (step S107: YES), the brightness reduction processing unit 311 proceeds to a process in step S109.

(Step S109) The brightness reduction processing unit 311 changes the screen brightness from the standard brightness to the low brightness. Then, the brightness reduction processing unit 311 proceeds to a process in step S111.

(Step S111) The brightness reduction processing unit 311 determines whether or not the "Attention" information is acquired from the face detection unit 210. When determining that the "Attention" information is not acquired (NO), the brightness reduction processing unit 311 performs the process in step S111 again. On the other hand, when determining that the "Attention" information is acquired (YES), the brightness reduction processing unit 311 restores the screen brightness to the standard brightness (step S113).

Figure 9:
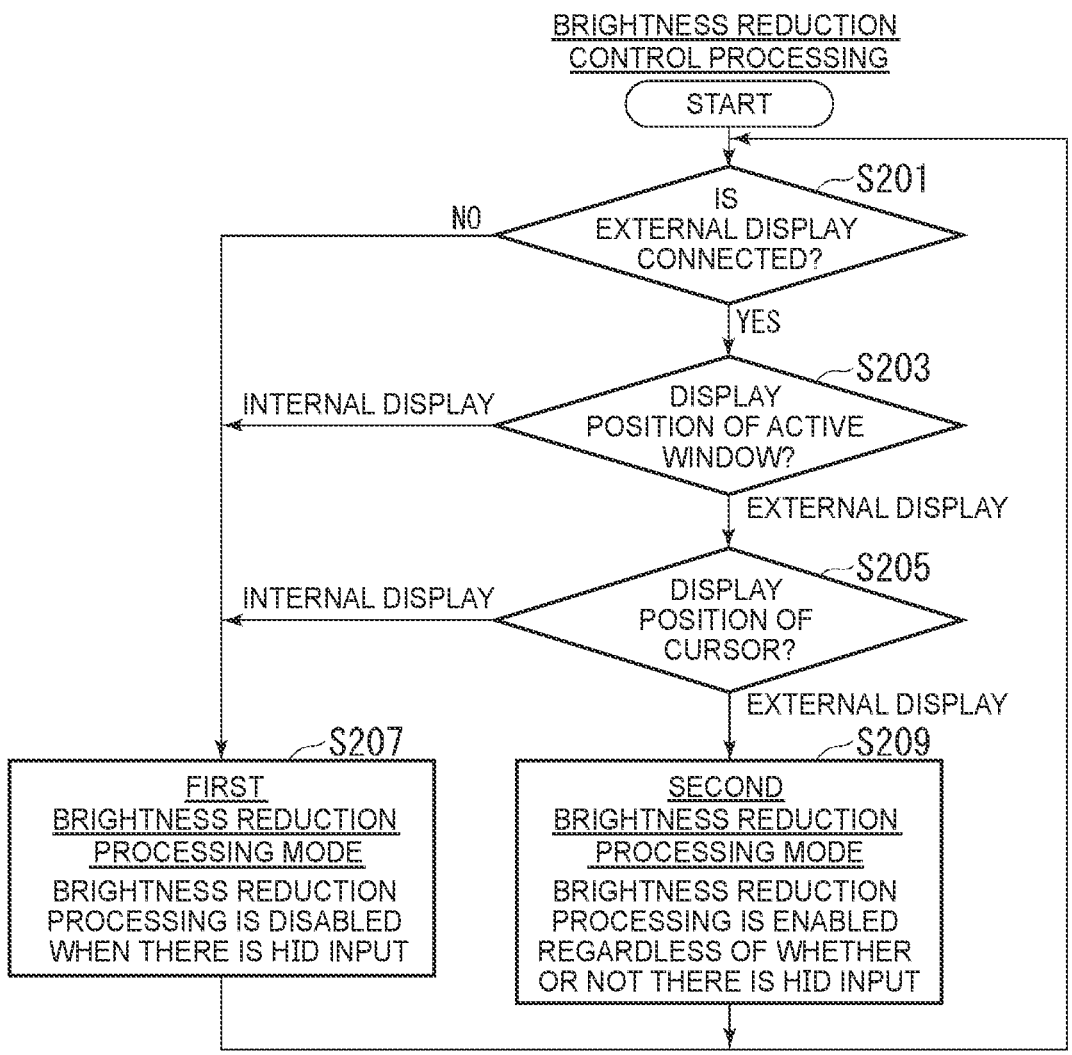
FIG. 9 is a flowchart illustrating an example of brightness reduction control processing according to one or more embodiments.

Referring next to FIG. 9, the operation of brightness reduction control processing executed by the brightness reduction control unit 315 will be described. FIG. 9 is a flowchart illustrating an example of brightness reduction control processing according to one or more embodiments.

(Step S201) The brightness reduction control unit 315 determines whether or not the external display is connected based on the detection result of the connection detection unit 312. When determining that the external display is not connected (NO), the brightness reduction control unit 315 proceeds to a process in step S207. On the other hand, when determining that the external display is connected (YES), the brightness reduction control unit 315 proceeds to a process in step S203.

(Step S203) The brightness reduction control unit 315 determines the display position of the active window based on the determination result of the display state determination unit 314. When determining that the display position of the active window is in the internal display, the brightness reduction control unit 315 proceeds to the process in step S207. On the other hand, when determining that the display position of the active window is in the external display, the brightness reduction control unit 315 proceeds to a process in step S205.

(Step S205) The brightness reduction control unit 315 determines the display position of the cursor based on the determination result of the display state determination unit 314. When determining that the display position of the cursor is in the internal display, the brightness reduction control unit 315 proceeds to the process in step S207. On the other hand, when determining that the display position of the cursor is in the external display, the brightness reduction control unit 315 proceeds to a process in step S209.

(Step S207) The brightness reduction control unit 315 controls the brightness reduction processing for the internal display to enabled or disabled in the "first brightness reduction processing mode (normal brightness reduction processing mode). For example, the brightness reduction control unit 315 disables brightness reduction processing for the internal display in response to the fact that there is HID input.

(Step S209) The brightness reduction control unit 315 controls the brightness reduction processing for the internal display to enabled or disabled in the "second brightness reduction processing mode." For example, the brightness reduction control unit 315 enables the brightness reduction processing for the internal display regardless of whether or not there is HID input.

As described above, the information processing apparatus 1 according to one or more embodiments includes a memory (for example, the system memory 304) which temporarily stores image data of a captured image captured by the imaging unit 120. Further, the information processing apparatus 1 includes the face detection unit 210, the CPU 301, the chipset 303, and the like as an example of a processor. The face detection unit 210 executes face detection processing to process the image data of the captured image stored in the above memory in order to detect a face area with a face captured therein and an orientation of the face from the captured image. Further, the information processing apparatus 1 includes the display unit 110 as an internal display, and the external connection terminal 130 (an example of a connection unit) to connect to the external display device 5 as an external display.

The information processing apparatus 1 executes brightness reduction processing to reduce the screen brightness of the internal display based on the orientation of the face toward the internal display detected by the above face detection processing. Further, the information processing apparatus 1 enables the brightness reduction processing when both of an active window and a cursor are not displayed on a screen of the internal display in a state where the external display is connected. On the other hand, the information processing apparatus 1 disables the brightness reduction processing when either one or both of the active window and the cursor are displayed on the screen of the internal display in the case where the external display is connected.

Thus, when it is assumed that the user is looking at (paying attention to) the external display, since the information processing apparatus 1 will enable the brightness reduction processing for the internal display even if there is HID input (user input), power can be saved. On the other hand, since the information processing apparatus 1 disables the brightness reduction processing when there is a possibility that the user is looking at (paying attention to) the internal display, the screen brightness can be prevented from being reduced even when the user is looking at (paying attention to) the internal display. Thus, the information processing apparatus 1 can reduce the screen brightness of the internal display properly depending on the orientation of the face even when the external display is connected.

For example, when the brightness reduction processing is enabled in the state where the external display is not connected, the information processing apparatus 1 disables the brightness reduction processing in response to the fact that there is HID input. On the other hand, when both of the active window and the cursor are not displayed on the screen of the internal display in the state where the external display is connected, the information processing apparatus 1 enables the brightness reduction processing regardless of whether or not there is HID input (user input).

Thus, when there is HID input in the state where the external display is not connected, since it is assumed that the user is looking at (paying attention to) the internal display, the information processing apparatus 1 can prevent the screen brightness from being reduced. On the other hand, when it is assumed that the user is looking at (paying attention to) the external display in the state where the external display is connected, since the information processing apparatus 1 will enable the brightness reduction processing for the internal display even if there is HID input (user input), power can be saved. Therefore, the information processing apparatus 1 can reduce the screen brightness of the internal display depending on the orientation of the face properly regardless of when the external display is connected or when the external display is not connected.

Further, even when either one or both of the active window and the cursor are displayed on the screen of the internal display in the state where the external display is connected, the information processing apparatus 1 will enable the brightness reduction processing if there is no HID input, or disable the brightness reduction processing in response to the fact that there is user input.

Thus, even when either one or both of the active window and the cursor are displayed on the screen of the internal display, since it can be assumed that the user is not looking at (not paying attention to) the internal display if there is no HID input and the face is not facing forward, the information processing apparatus 1 can enable the brightness reduction processing for the internal display to save power.

Note that, when either one or both of the active window and the cursor are displayed on the screen of the internal display in the state where the external display is connected, the information processing apparatus 1 may disable the brightness reduction processing regardless of whether or not there is HID input. In this case, the information processing apparatus 1 cannot save power in such a state that there is no HID input and the face is not facing forward, but the information processing apparatus 1 can prevent the screen brightness from being reduced even though the user is looking at (paying attention to) the internal display.

Further, a control method for the information processing apparatus 1 according to the present invention includes: a step of performing face detection processing to process image data of a captured image stored in a memory (for example, the system memory 304) in order to detect a face area with a face captured therein and an orientation of the face from the captured image; a step of performing brightness reduction processing to reduce the screen brightness of an internal display based on the orientation of the face toward the internal display detected by the face detection processing; and a step of performing brightness reduction control processing to enable the brightness reduction processing when both of an active window and a cursor are not displayed on a screen of the internal display in a state where an external display is connected, or to disable the brightness reduction processing when either one or both of the active window and the cursor are displayed on the screen of the internal display.

Thus, when it is assumed that the user is looking at (paying attention to) the external display, since the control method for the information processing apparatus 1 will enable the brightness reduction processing for the internal display even if there is HID input (user input), power can be saved. On the other hand, since the control method for the information processing apparatus 1 disables the brightness reduction processing when there is a possibility that the user is looking at (paying attention to) the internal display, the screen brightness can be prevented from being reduced even when the user is looking at (paying attention to) the internal display. Thus, the control method for the information processing apparatus 1 can reduce the screen brightness of the internal display properly depending on the orientation of the face even when the external display is connected.

Next, another embodiment of the present invention will be described.

In the above-described embodiments, the brightness reduction processing for the internal display is described, but the brightness reduction processing may also be performed for the external display in the same way. Note that it can be applied to an external display having a function to change the screen brightness under the control of the information processing apparatus 1. Since the basic configurations of the information processing apparatus 1 according to one or more embodiments are the same as the configurations described in the above-described embodiments with reference to FIG. 1, FIG. 2, FIG. 6, and FIG. 7, the description thereof will be omitted. Further, the brightness reduction processing described with reference to FIG. 8 can also be applied to that for the external display in the same way.

Figure 10:
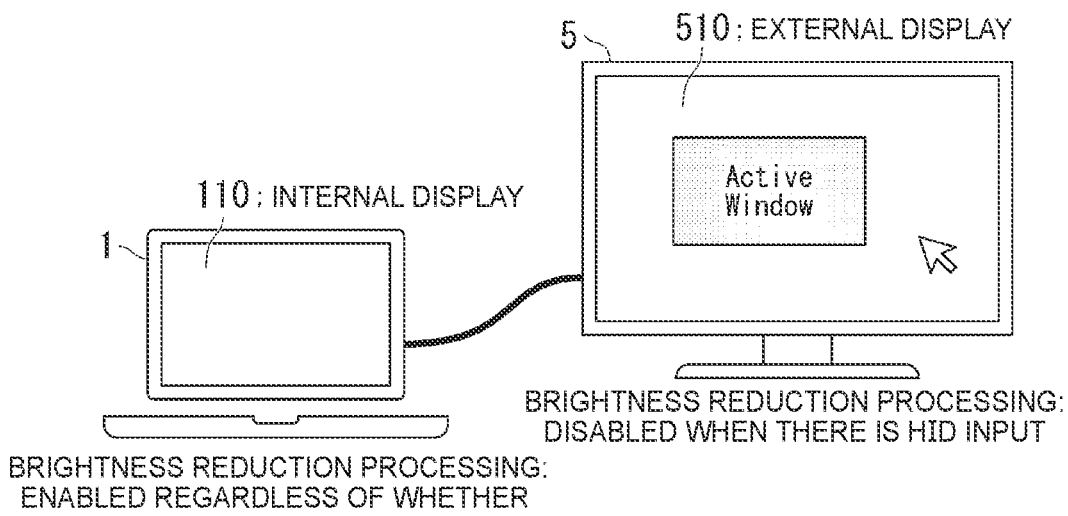
FIG. 10 is a schematic diagram illustrating a first example of a state in which the information processing apparatus according to one or more embodiments is connected to the external display and used.
Figure 11:
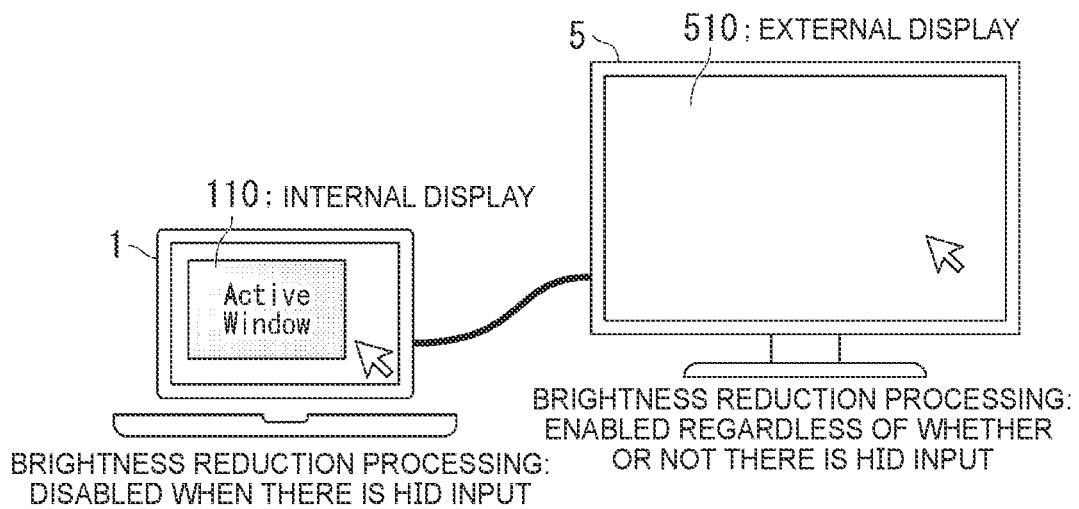
FIG. 11 is a schematic diagram illustrating a second example of the state in which the information processing apparatus according to one or more embodiments is connected to the external display and used.

Referring to FIG. 10 and FIG. 11, the overview of brightness reduction processing according to one or more embodiments will be described. Note that FIG. 10 and FIG. 11 add a description about brightness reduction processing for the external display to the description in FIG. 4 and FIG. 5. Since the brightness reduction processing for the internal display is the same as that in the above-described embodiments, the description thereof will be omitted.

FIG. 10 is a schematic diagram illustrating a first example of a state in which the information processing apparatus 1 according to one or more embodiments is connected to the external display and used. In this example illustrated in FIG. 10, the active window and the cursor are displayed on the screen of the external display, and both of the active window and the cursor are not displayed on the screen of the internal display. In this case, it can be assumed that the user is looking at (paying attention to) the external display. Therefore, when either one or both of the active window and the cursor are displayed on the screen of the external display, the information processing apparatus 1 disables the brightness reduction processing for the internal display in response to the fact that there is HID input.

FIG. 11 is a schematic diagram illustrating a second example of the state in which the information processing apparatus 1 according to one or more embodiments is connected to the external display and used.

In this example illustrated in FIG. 11, the active window and the cursor are displayed on the screen of the internal display, and both of the active window and the cursor are not displayed on the screen of the external display. In this case, it can be assumed that the user is looking at (paying attention to) the internal display. Therefore, when both of the active window and the cursor are not displayed on the screen of the external display, the information processing apparatus 1 enables the brightness reduction processing for the external display regardless of whether or not there is HID input (that is, even when there is HID input).

Thus, the information processing apparatus 1 executes brightness reduction processing (external brightness reduction processing) to reduce the screen brightness of the external display based on the orientation of the face toward the external display detected by the face detection processing. For example, when both of the active window and the cursor are not displayed on the screen of the external display in the state where the external display is connected, the information processing apparatus 1 enables the brightness reduction processing for the external display. On the other hand, when either one or both of the active window and the cursor are displayed on the screen of the external display in the state where the external display is connected, the information processing apparatus 1 disables the brightness reduction processing for the external display.

Thus, when it is assumed that the user is looking at (paying attention to) the internal display, since the information processing apparatus 1 will enable the brightness reduction processing for the external display even if there is HID input (user input), power can be saved. On the other hand, when there is a possibility that the user is looking at (paying attention to) the external display, since the information processing apparatus 1 disables the brightness reduction processing, the screen brightness can be prevented from being reduced even when the user is looking at (paying attention to) the external display. Thus, the information processing apparatus 1 can reduce the screen brightness of the external display properly depending on the orientation of the face even when the external display is connected.

For example, when both of the active window and the cursor are not displayed on the screen of the external display in the state where the external display is connected, the information processing apparatus 1 enables the brightness reduction processing for the external display regardless of whether or not there is HID input (user input).

Thus, when it is assumed that the user is looking at (paying attention to) the internal display, since the information processing apparatus 1 will enable the brightness reduction processing for the external display even if there is HID input (user input), power can be saved.

Further, even when either one or both of the active window and the cursor are displayed on the screen of the external display in the state where the external display is connected, the information processing apparatus 1 will enable the brightness reduction processing for the external display if there is no HID input, and disable the brightness reduction processing for the external display in response to the fact that there is HID input.

Thus, even when either one or both of the active window and the cursor are displayed on the screen of the external display, since it can be assumed that the user is not looking at (not paying attention to) the external display if there is no HID input and the face is not facing toward the external display, the information processing apparatus 1 can enable the brightness reduction processing for the external display to save power.

Figure 12:
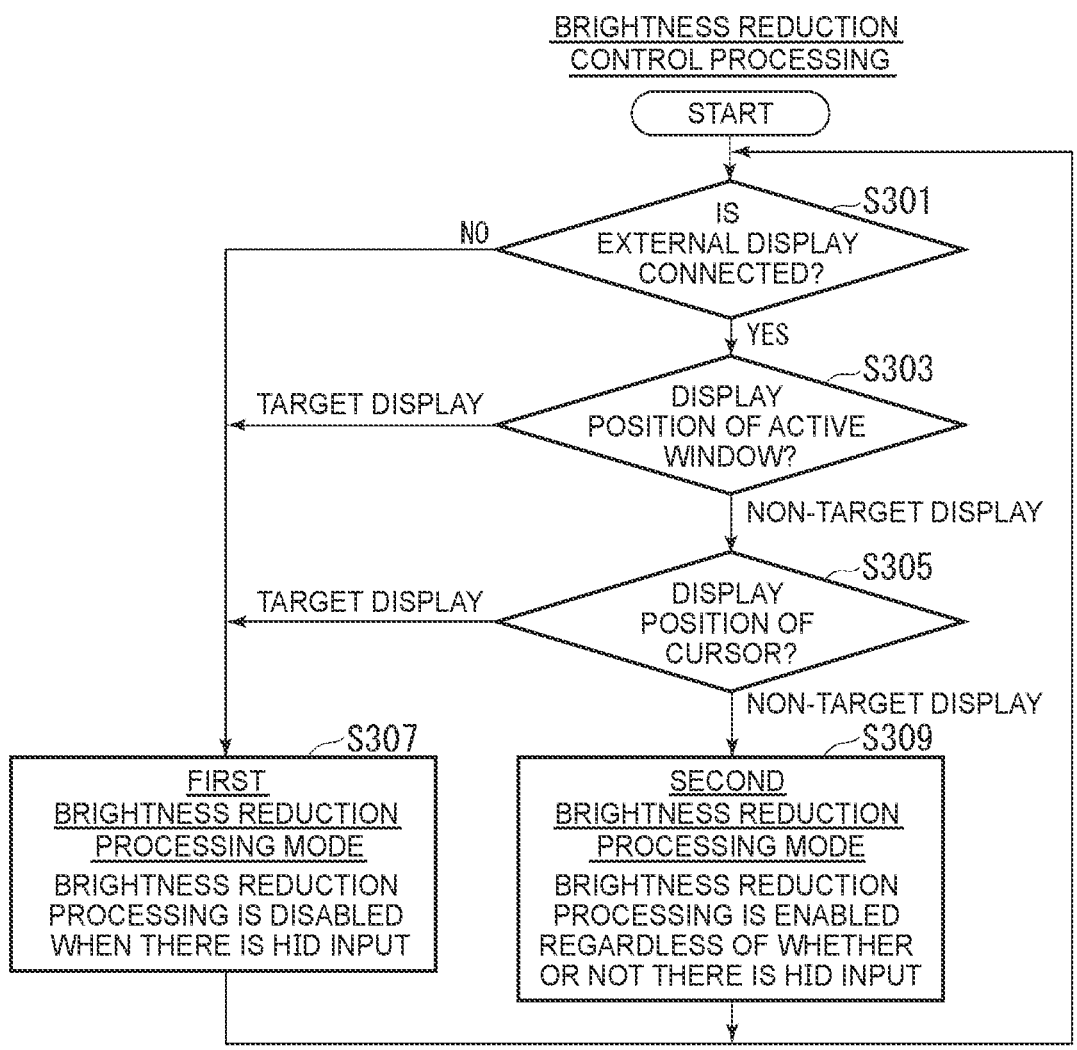
FIG. 12 is a flowchart illustrating an example of brightness reduction control processing according to one or more embodiments.

Referring next to FIG. 12, the operation of brightness reduction control processing executed by the brightness reduction control unit 315 will be described. FIG. 12 is a flowchart illustrating an example of brightness reduction control processing according to one or more embodiments. In one or more embodiments, both of the internal display and the external display can be targeted for the brightness reduction processing, respectively. In the following, the description will be made by referring to a display targeted for the brightness reduction processing between the internal display and the external display as a "target display," and a display that is not the "target display" as a "non-target display."

(Step S301) The brightness reduction control unit 315 determines whether or not the external display is connected based on the detection result of the connection detection unit 312. When determining that the external display is not connected (NO), the brightness reduction control unit 315 proceeds to a process in step S307. On the other hand, when determining that the external display is connected (YES), the brightness reduction control unit 315 proceeds to a process in step S303.

(Step S303) The brightness reduction control unit 315 determines a display position of the active window based on the determination result of the display state determination unit 314. When determining that the display position of the active window is in a target display, the brightness reduction control unit 315 proceeds to the process in step S307. On the other hand, when determining that the display position of the active window is in a non-target display, the brightness reduction control unit 315 proceeds to a process in step S305.

(Step S305) The brightness reduction control unit 315 determines a display position of the cursor based on the determination result of the display state determination unit 314. When determining that the display position of the cursor is in the target display, the brightness reduction control unit 315 proceeds to the process in step S307. On the other hand, when determining that the display position of the cursor is in the non-target display, the brightness reduction control unit 315 proceeds to a process in step S309.

(Step S307) The brightness reduction control unit 315 controls enabling or disabling of the brightness reduction processing for the target display in the "first brightness reduction processing mode" (normal brightness reduction processing mode). For example, the brightness reduction control unit 315 disables the brightness reduction processing for the target display in response to the fact that there is HID input.

(Step S309) The brightness reduction control unit 315 controls enabling or disabling of the brightness reduction processing for the target display in the "second brightness reduction processing mode." For example, the brightness reduction control unit 315 enables the brightness reduction processing for the target display regardless of whether or not there is HID input.

As described above, the information processing apparatus 1 according to one or more embodiments includes a memory (for example, the system memory 304) which temporarily stores image data of a captured image captured by the imaging unit 120. Further, the information processing apparatus 1 includes the face detection unit 210, the CPU 301, the chipset 303, and the like as an example of a processor. The face detection unit 210 executes face detection processing to process the image data of the captured image stored in the above memory in order to detect a face area with a face captured therein and an orientation of the face from the captured image. Further, the information processing apparatus 1 includes the display unit 110 as an internal display, and the external connection terminal 130 (an example of a connection unit) to connect to the external display device 5 as an external display.

The information processing apparatus 1 executes brightness reduction processing to reduce the screen brightness of the internal display or the external display based on the orientation of the face detected by the above face detection processing. Further, the information processing apparatus 1 enables the brightness reduction processing for a target display when both of an active window and a cursor are not displayed on a screen of the target display targeted for the brightness reduction processing between the internal display and the external display in a state where the external display is connected. On the other hand, the information processing apparatus 1 disables the brightness reduction processing for the target display when either one or both of the active window and the cursor are displayed on the screen of the target display in the state where the external display is connected.

Thus, when it is assumed that the user is looking at (paying attention to) a non-target display, since the information processing apparatus 1 will enable the brightness reduction processing for the target display even if there is HID input (user input), power can be saved. On the other hand, since the information processing apparatus 1 disables the brightness reduction processing when there is a possibility that the user is looking at (paying attention to) the target display, the screen brightness can be prevented from being reduced even when the user is looking at (paying attention to) the target display. Thus, the information processing apparatus 1 can reduce the screen brightness of the external display properly depending on the orientation of the face even when the external display is connected.

For example, when both of the active window and the cursor are not displayed on the screen of the target display in the state where the external display is connected, the information processing apparatus 1 enables the brightness reduction processing for the target display regardless of whether or not there is HID input (user input).

Thus, when it is assumed that the user is looking at (paying attention to) the non-target display in the state where the external display is connected, since the information processing apparatus 1 will enable the brightness reduction processing for the target display even if there is HID input (user input), power can be saved.

Further, even when either one or both of the active window and the cursor are displayed on the screen of the target display in the state where the external display is connected, the information processing apparatus 1 will enable the brightness reduction processing for the target display if there is no HID input, or disable the brightness reduction processing for the target display in response to the fact that there is HID input.

Thus, even when either one or both of the active window and the cursor are displayed on the screen of the target display, since it can be assumed that the user is not looking at (not paying attention to) the target display if there is no HID input and the face is not facing toward the target display, the information processing apparatus 1 can enable the brightness reduction processing for the target display to save power.

Further, a control method for the information processing apparatus 1 according to one or more embodiments includes: a step of performing face detection processing to process image data of a captured image stored in the memory (for example, the system memory 304) in order to detect a face area with a face captured therein and an orientation of the face from the captured image; a step of performing brightness reduction processing to reduce the screen brightness of an internal display or an external display based on the orientation of the face detected by the face detection processing; and a step of performing brightness reduction control processing to enable the brightness reduction processing for a target display when both of the active window and the cursor are not displayed on the screen of the target display targeted for the brightness reduction processing between the internal display and the external display in the state where the external display is connected, or to disable the brightness reduction processing for the target display when either one or both of the active window and the cursor are displayed on the screen of the target display.

Thus, when it is assumed that the user is looking at (paying attention to) a non-target display, since the control method for the information processing apparatus 1 will enable the brightness reduction processing for the target display even if there is HID input (user input), power can be saved. On the other hand, since the control method for the information processing apparatus 1 disables the brightness reduction processing when there is a possibility that the user is looking at (paying attention to) the target display, the screen brightness can be prevented from being reduced even when the user is looking at (paying attention to) the target display. Thus, the control method for the information processing apparatus 1 can reduce the screen brightness of the external display properly depending on the orientation of the face even when the external display is connected.

While the embodiments of this invention have been described in detail above with reference to the accompanying drawings, the specific configurations are not limited to those in the embodiments described above, and design changes are also included without departing from the scope of this invention. For example, the respective components described in the above-described embodiments can be combined arbitrarily.

Further, in the aforementioned embodiments, the configuration example in which one external display (external display device 5) is connected to the information processing apparatus 1 is described, but two or more external displays may also be connected.

Further, the CPU 301 and the chipset 303 may be configured as individual processors, or configured to be integrated as one processor.

Further, in the aforementioned embodiments, the example in which the face detection unit 210 is provided separated from the CPU 301 and the chipset 303 is illustrated, but some or all of the functions of the face detection unit 210 may be provided in the chipset 303, or may be provided in a processor integrated with the CPU 301 or the chipset 303. For example, the CPU 301, the chipset 303, and the face detection unit 210 may be configured as individual processors, respectively, or may be configured to be integrated as one processor. Further, some or all of the functions of the face detection unit 210 may be provided in the EC 200. Further, part of the system processing unit 310 may be provided in the EC 200.

Further, a hibernation state, a power-off state, and the like may be included as the standby state described above. The hibernation state corresponds, for example, to S4 state defined in the ACPI specification. The power-off state corresponds, for example, to S5 state (shutdown state) defined in the ACPI specification. Note that the standby state, the sleep state, the hibernation state, the power-off state, and the like as the standby state are states lower in power consumption than the normal operating state (states of reducing power consumption).

Note that the information processing apparatus 1 described above has a computer system therein. Then, a program for implementing the function of each component included in the information processing apparatus 1 described above may be recorded on a computer-readable recording medium so that the program recorded on this recording medium is read into the computer system and executed to perform processing in each component included in the information processing apparatus 1 described above. Here, the fact that "the program recorded on the recording medium is read into the computer system and executed" includes installing the program on the computer system. It is assumed that the "computer system" here includes the OS and hardware such as peripheral devices and the like. Further, the "computer system" may also include two or more computers connected through networks including the Internet, WAN, LAN, and a communication line such as a dedicated line. Further, the "computer-readable recording medium" means a storage medium such as a flexible disk, a magneto-optical disk, a portable medium like a flash ROM or a CD-ROM, or a hard disk incorporated in the computer system. Thus, the recording medium with the program stored thereon may be a non-transitory recording medium such as the CD-ROM.

Further, a recording medium internally or externally provided to be accessible from a delivery server for delivering the program is included as the recording medium. Note that the program may be divided into plural pieces, downloaded at different timings, respectively, and then united in each component included in the information processing apparatus 1, or delivery servers for delivering respective divided pieces of the program may be different from one another. Further, it is assumed that the "computer-readable recording medium" includes a medium on which the program is held for a given length of time, such as a volatile memory (RAM) inside a computer system as a server or a client when the program is transmitted through a network. The above-mentioned program may also be to implement some of the functions described above. Further, the program may be a so-called differential file (differential program) capable of implementing the above-described functions in combination with a program(s) already recorded in the computer system.

Further, some or all of the functions of the information processing apparatus 1 in the embodiments described above may be realized as an integrated circuit such as LSI (Large Scale Integration). Each function may be implemented by a processor individually, or some or all of the functions may be integrated as a processor. Further, the method of circuit integration is not limited to LSI, and it may be realized by a dedicated circuit or a general-purpose processor. Further, if integrated circuit technology replacing the LSI appears with the progress of semiconductor technology, an integrated circuit according to the technology may be used.

Further, the information processing apparatus 1 of the aforementioned embodiments is not limited to the laptop PC, which may also be, for example, a desktop PC or the like.

DESCRIPTION OF SYMBOLS

| | |
|---|---|
| 1 | information processing apparatus |
| 10 | first chassis |
| 20 | second chassis |
| 15 | hinge mechanism |
| 110 | display unit |
| 120 | imaging unit |
| 130 | external connection terminal |
| 140 | power button |
| 150 | input device |
| 151 | keyboard |
| 153 | touch pad |
| 160 | communication unit |
| 170 | storage unit |
| 200 | EC |
| 210 | face detection unit |
| 211 | face area detection unit |
| 212 | face direction detection unit |
| 213 | detection result output unit |
| 300 | main processing unit |
| 301 | CPU |
| 302 | GPU |
| 303 | chipset |
| 304 | system memory |
| 310 | system processing unit |
| 311 | brightness reduction processing unit |
| 312 | connection detection unit |
| 313 | HID input detection unit |
| 314 | display state determination unit |
| 315 | brightness reduction control unit |
| 400 | power supply unit |

What is claimed is:

1. An information processing apparatus comprising:
a memory which temporarily stores image data of an image captured by an imaging unit;
a processor which processes the image data stored in the memory;
an internal display; and
a connection unit which connects to an external display, wherein
the processor performs
face detection processing to process the image data of the image stored in the memory in order to detect a face area with a face captured therein and an orientation of the face from the image,
brightness reduction processing to reduce screen brightness of the internal display based on the orientation of the face toward the internal display detected by the face detection processing, and
brightness reduction control processing to enable the brightness reduction processing when both of an active window and a cursor are not displayed on a screen of the internal display in a state where the external display is connected, or to disable the brightness reduction processing when either one or both of the active window and the cursor are displayed on the screen of the internal display,
in the brightness reduction processing, the processor further performs external brightness reduction processing to reduce screen brightness of the external display based on an orientation of the face toward the external display detected by the face detection processing, and
in the brightness reduction control processing, the processor enables the external brightness reduction processing when both of the active window and the cursor are not displayed on a screen of the external display in the state where the external display is connected, or disables the external brightness reduction processing when either one or both of the active window and the cursor are displayed on the screen of the external display.

2. The information processing apparatus according to claim 1, wherein in the brightness reduction control processing,
when the brightness reduction processing is enabled in a state where the external display is not connected, the processor disables the brightness reduction processing in response to a fact that there is user input, or
when both of the active window and the cursor are not displayed on the screen of the internal display in the state where the external display is connected, the processor enables the brightness reduction processing regardless of whether or not there is user input.

3. The information processing apparatus according to claim 1, wherein in the brightness reduction control processing, even when either one or both of the active window and the cursor are displayed on the screen of the internal display in the state where the external display is connected, the processor will enable the brightness reduction processing if there is no user input, or disable the brightness reduction processing in response to the fact that there is user input.

4. The information processing apparatus according to claim 1, wherein in the brightness reduction control processing, when both of the active window and the cursor are not displayed on the screen of the external display in the state where the external display is connected, the processor enables the external brightness reduction processing regardless of whether or not there is user input.

5. The information processing apparatus according to claim 1, wherein in the brightness reduction control processing, even when both of the active window and the cursor are displayed on the screen of the external display in the state where the external display is connected, the processor will enable the external brightness reduction processing if there is no user input, or disable the external brightness reduction processing in response to the fact that there is user input.

6. An information processing apparatus comprising:
   a memory which temporarily stores image data of an image captured by an imaging unit;
   a processor which processes the image data stored in the memory;
   an internal display; and
   a connection unit which connects to an external display, wherein
   the processor performs
      face detection processing to process the image data of the image stored in the memory in order to detect a face area with a face captured therein and an orientation of the face from the image,
      brightness reduction processing to reduce screen brightness of the internal display or the external display based on the orientation of the face detected by the face detection processing, and
      brightness reduction control processing to enable the brightness reduction processing for a target display when both of an active window and a cursor are not displayed on a screen of the target display targeted for the brightness reduction processing between the internal display and the external display in a state where the external display is connected, or to disable the brightness reduction processing for the target display when either one or both of the active window and the cursor are displayed on the screen of the target display,
   in the brightness reduction processing, the processor further performs non-target brightness reduction processing to reduce screen brightness of a non-target display that is not targeted for the brightness reduction processing between the internal display and the external display based on an orientation of the face toward the non-target display detected by the face detection processing, and
   in the brightness reduction control processing, the processor enables the non-target brightness reduction processing when both of the active window and the cursor are not displayed on a screen of the non-target display in the state where the external display is connected, or disables the non-target brightness reduction processing when either one or both of the active window and the cursor are displayed on the screen of the non-target display.

7. The information processing apparatus according to claim 6, wherein in the brightness reduction control processing, when both of the active window and the cursor are not displayed on the screen of the target display in the state where the external display is connected, the processor enables the brightness reduction processing regardless of whether or not there is user input.

8. The information processing apparatus according to claim 6, wherein in the brightness reduction control processing, even when either one or both of the active window and the cursor are displayed on the screen of the target display in the state where the external display is connected, the processor will enable the brightness reduction processing if there is no user input, or disable the brightness reduction processing in response to the fact that there is user input.

9. A control method for an information processing apparatus including: a memory which temporarily stores image data of an image captured by an imaging unit; a processor which processes the image data stored in the memory; an internal display; and a connection unit which connects to an external display, the control method comprising:
   a step of causing the processor to perform face detection processing to process the image data of the image stored in the memory in order to detect a face area with a face captured therein and an orientation of the face from the image;
   a step of causing the processor to perform brightness reduction processing to reduce screen brightness of the internal display based on the orientation of the face toward the internal display detected by the face detection processing; and
   a step of causing the processor to perform brightness reduction control processing to enable the brightness reduction processing when both of an active window and a cursor are not displayed on a screen of the internal display in a state where the external display is connected, or to disable the brightness reduction processing when either one or both of the active window and the cursor are displayed on the screen of the internal display, wherein
   in the brightness reduction processing, the processor further performs external brightness reduction processing to reduce screen brightness of the external display based on an orientation of the face toward the external display detected by the face detection processing, and
   in the brightness reduction control processing, the processor enables the external brightness reduction processing when both of the active window and the cursor are not displayed on a screen of the external display in the state where the external display is connected, or disables the external brightness reduction processing when either one or both of the active window and the cursor are displayed on the screen of the external display.

10. A control method for an information processing apparatus including: a memory which temporarily stores image data of an image captured by an imaging unit; a processor which processes the image data stored in the memory; an internal display; and a connection unit which connects to an external display, the control method comprising:
   a step of causing the processor to perform face detection processing to process the image data of the image stored in the memory in order to detect a face area with a face captured therein and an orientation of the face from the image;
   a step of causing the processor to perform brightness reduction processing to reduce screen brightness of the internal display or the external display based on the orientation of the face detected by the face detection processing; and
   a step of causing the processor to perform brightness reduction control processing to enable the brightness reduction processing for a target display when both of an active window and a cursor are not displayed on a screen of the target display targeted for the brightness reduction processing between the internal display and the external display in a state where the external display is connected, or to disable the brightness reduction processing for the target display when either one or both of the active window and the cursor are displayed on the screen of the target display, wherein in the brightness reduction processing, the processor further performs non-target brightness reduction processing to reduce screen brightness of a non-target display that is not targeted for the brightness reduction processing between the internal display and the external display based on an orientation of the face toward the non-target display detected by the face detection processing, and in the brightness reduction control processing, the processor enables the non-target brightness reduction processing when both of the active window and the cursor are not displayed on a screen of the non-target display in the state where the external display is connected, or disables the non-target brightness reduction processing when either one or both of the active window and the cursor are displayed on the screen of the non-target display.

* * * * *